United States Patent
Kim et al.

(10) Patent No.: US 10,266,696 B2
(45) Date of Patent: Apr. 23, 2019

(54) POLYMER COMPOSITION, MOLDED ARTICLE, AND METHOD FOR MANUFACTURING SAME

(71) Applicant: SAMSUNG ELECTRONICS CO., LTD., Suwon-si, Gyeonggi-do (KR)

(72) Inventors: In Kim, Suwon-si (KR); Song Won Hyun, Yongin-si (KR); Seon Yeong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 15/314,293

(22) PCT Filed: Mar. 26, 2015

(86) PCT No.: PCT/KR2015/002995
§ 371 (c)(1),
(2) Date: Nov. 28, 2016

(87) PCT Pub. No.: WO2015/182862
PCT Pub. Date: Dec. 3, 2015

(65) Prior Publication Data
US 2017/0190914 A1    Jul. 6, 2017

(30) Foreign Application Priority Data
May 26, 2014 (KR) .................. 10-2014-0063037

(51) Int. Cl.
| B29B 17/00 | (2006.01) |
| C08L 69/00 | (2006.01) |
| C08L 101/16 | (2006.01) |
| B29C 47/00 | (2006.01) |
| C08L 63/00 | (2006.01) |
| B29C 45/00 | (2006.01) |

(52) U.S. Cl.
CPC ............ *C08L 101/16* (2013.01); *B29B 17/00* (2013.01); *B29C 45/0001* (2013.01); *B29C 47/00* (2013.01); *C08L 63/00* (2013.01); *C08L 69/00* (2013.01)

(58) Field of Classification Search
CPC ..... C08L 101/16; C08L 2207/53; C08L 69/00
See application file for complete search history.

(56) References Cited

U.S. PATENT DOCUMENTS

| 2009/0011213 A1 | 1/2009 | Tripathi |
| 2009/0030171 A1* | 1/2009 | Leenders ................ C08L 69/00 528/196 |
| 2012/0245262 A1 | 9/2012 | Hao et al. |
| 2013/0085252 A1* | 4/2013 | Kwon ................ C08G 64/1608 528/204 |
| 2014/0045968 A1* | 2/2014 | Kim ................... C08L 69/00 523/122 |
| 2014/0296383 A1* | 10/2014 | Xin ..................... C08K 5/0066 523/435 |
| 2015/0141560 A1* | 5/2015 | Yu .......................... C08L 69/00 524/127 |

FOREIGN PATENT DOCUMENTS

| CA | 2030834 | 6/1991 |
| CA | 2768305 A1 | 1/2011 |
| EP | 0155989 A1 | 9/1984 |
| EP | 0273151 A2 | 11/1987 |
| EP | 0273151 A3 | 11/1987 |
| EP | 0440008 A1 | 8/1991 |
| EP | 2617767 A1 | 7/2013 |
| EP | 2873684 A1 | 5/2015 |
| KR | 10-2010-0079986 | 7/2010 |
| KR | 10-2014-0022835 | 2/2014 |
| WO | WO 2015/182862 A1 | 12/2015 |

OTHER PUBLICATIONS

Australian Notice of acceptance for patent application dated Aug. 21, 2017 in corresponding Australian Patent Application No. 2015268400.
Extended European Search Report dated Oct. 23, 2017 in corresponding European Patent Application No. 15799144.9.
European Written Opinion dated Oct. 23, 2017 in corresponding European Patent Application No. 15799144.9.
Chetna Sharon et al.: "Studies on Biodegradation of Polyethylene terephthalate: A synthetic polymer," Journal of Microbiology and Biotechnology Research, vol. 2, No. 2, pp. 248-257, XP002774648, 2012.
International Search Report (Form PCT/ISA/210); dated Jun. 16, 2015 in International Patent Application No. PCT/KR2015/002995 (3 pages) (2 pages English Translation).
Written Opinion (Form PCT/ISA/237); dated Jun. 16, 2015 in International Patent Application No. PCT/KR2015/002995 (5 pages).
Canadian Office Action dated Nov. 24, 2017 in Canadian Patent Application No. 2,950,401.
Australian Examination Report dated Mar. 27, 2017 in related Australian Patent Application No. 2015268400 (3 pages).
Chinese Office Action dated Mar. 8, 2018 in corresponding Chinese Patent Application No. 201580036818.1.

(Continued)

*Primary Examiner* — Jeffrey C Mullis (74) *Attorney, Agent, or Firm* — Staas & Halsey LLP (57) ABSTRACT

Provided are: a polymer composition, as an eco-friendly material, comprising a post consumer material (PCM) resin and a bio-based resin; a molded article; and a method for manufacturing the same. The polymer composition according to an embodiment comprises a thermoplastic resin containing polycarbonate, a post consumer material (PCM) resin, a bio-based resin, and a core-shell type elastomer.

22 Claims, 5 Drawing Sheets

(56) References Cited

OTHER PUBLICATIONS

Chinese Office Action dated Sep. 10, 2018 in corresponding Chinese Patent Application No. 201580036818.1.
European Office Action dated Sep. 13, 2018 in corresponding European Patent Application No. 15799144.9.
Canadian Office Action dated Sep. 10, 2018 in corresponding Canadian Patent Application No. 2,950,401.

* cited by examiner

POLYMER COMPOSITION, MOLDED ARTICLE, AND METHOD FOR MANUFACTURING SAME

CROSS-REFERENCE TO RELATED APPLICATIONS

This application is a U.S. national stage application under 35 USC 371 of PCT international application PCT/KR2015/002995, filed on Mar. 26, 2015 and claims the benefit of Korean Patent Application No. 10-2014-0063037, filed on May 26, 2014, respectively. The contents of PCT international application PCT/KR2015/002995 are incorporated herein by reference.

TECHNICAL FIELD

The present invention relates to a polymer composition, a molded article, and a method of manufacturing same, and more particularly, to an eco-friendly flame retardant polymer composition, a molded article, and a method of manufacturing same.

BACKGROUND ART

With recent advances in electronics and communications industries, imaging apparatuses and portable wireless terminals have become smaller in size, thinner in thickness, lighter in weight, and higher in image quality, and functions thereof have been diversified.

Thus, there is a need to develop materials maintaining high rigidity of products despite thinness thereof, having rheological properties not affecting formation of the products, and eco-friendliness satisfying customers' needs.

Conventional, recycled materials such as post-consumer materials (PCM) or post-consumer resins (PCR) or bio-materials have been used to achieve these objects.

However, if recycled materials are used, it is difficult to keep supply and demand of raw materials in balance and physical properties of products such as impact strength may deteriorate. Bio-materials may change physical properties of injection-molded products due to crystallization and may not be suitable for injection-molding processes due to slow crystallization rates.

DISCLOSURE

Technical Problem

An aspect of the present disclosure is to provide a polymer composition including a post-consumer material (PCM) resin, as an eco-friendly material, and a bio-based resin, a molded article, and a method of manufacturing the same.

Another aspect of the present disclosure is to provide a polymer composition further including a thermoplastic resin having polycarbonate and a core-shell type elastomer to reinforce properties of the eco-friendly material, a molded article, and a method of manufacturing the same.

Technical Solution

According to an aspect of the present invention, a polymer composition comprising: a thermoplastic resin comprising polycarbonate; a post-consumer material (PCM) resin; a bio-based resin; and a core-shell type elastomer.

The bio-based resin may comprise at least one selected from the group consisting of poly(cyclohexylene dimethylene terephthalate) glycol (PCTG) and poly(ethylene terephthalate) glycol (PETG).

The PCM resin may comprise a PCM polycarbonate.

The core-shell type elastomer may comprise a core comprising at least one selected from the group consisting of butadiene and a butylacrylate-styrene copolymer; and a shell comprising polymethylmethacrylate (PMMA).

The thermoplastic resin comprises at least one selected from the group consisting of a low molecular weight polycarbonate and a high molecular weight polycarbonate, and wherein the high molecular weight polycarbonate has a melt index of 45 g/10 min or less (300° C., 1.2 kg), and the molecular weight polycarbonate has a melt index greater than 45 g/10 min (300° C., 1.2 kg).

The polymer composition may comprise 45 to 60% by weight of the thermoplastic resin, 1 to 20% by weight of the PCM resin, 1 to 20% by weight of the bio-based resin, and 5 to 15% by weight of the core-shell type elastomer, and wherein the 45 to 60% by weight of the thermoplastic resin comprises 45 to 55% by weight of the high molecular weight polycarbonate and 0 to 5% by weight of the low molecular weight polycarbonate.

The polymer composition may have an elongation of 110% or greater.

The polymer composition may have a flame retardancy level of V2 under the Underwriters Laboratory (UL) 94 standard.

The polymer composition may have a melt index of 15 g/10 min or greater (300° C., 1.2 kg).

The polymer composition may have an Izod notched impact strength of 60 kgfcm/cm or greater.

The polymer composition may have a heat distortion temperature (HDT) of 100° C. or grater.

The polymer composition may further comprise an additive at least one selected from the group consisting of a wax, a wax type master batch, a heat stabilizer, a UV stabilizer, an antioxidant stabilizer, a deodorant, and a surface stabilizer.

According to an another aspect of the present invention, a method of manufacturing a molded article comprise preparing a polymer composition comprising a thermoplastic resin comprising polycarbonate, a post-consumer material (PCM) resin, a bio-based resin, and a core-shell type elastomer by an extruder; and injection-molding the polymer composition by feeding the polymer composition into an injection-molding apparatus.

The preparing of the polymer composition may comprise extruding a composition comprising the thermoplastic resin comprising polycarbonate, the PCM resin, the bio-based resin, and the core-shell type elastomer.

The extruding of the composition may comprise melting the composition; and dispersing the composition by applying a shear stress to the composition.

The extruder may comprise at least one selected from the group consisting of a continuous flow single screw extruder and a continuous flow twin screw extruder.

According to an another aspect of the present invention, there is provided a molded article comprising a polymer composition comprising a thermoplastic resin comprising polycarbonate, a post-consumer material (PCM) resin, a bio-based resin, and a core-shell type elastomer.

The article may be molded in the shape of film, sheet, pellet, or fiber.

The molded article may comprise at least one selected from the group consisting of an interior material and exterior material of an electronic device, wherein the electronic device comprises a smart device, the interior material comprises a rear cover of the smart device, and the exterior material comprises at least one selected from the group consisting of a front cover, a front decoration, a home key, a side key, and a battery cover of the smart device.

The electronic device may comprise at least one selected from the group consisting of a display apparatus, a computer, a tablet PC, a printer, a multifunctional apparatus, a refrigerator, a washing machine, an air conditioner, a camera, an E-BOOK, E-Paper, 3D glasses, and a battery charger.

Advantageous Effects

According to the polymer composition, the molded article, and the method of manufacturing the same according to the present disclosure as described above have the following effects.

First, an eco-friendly material may be provided to comply with global eco-friendly policies.

Also, an injection-molding process into a thin product is possible to meet customers' needs for thin products.

Also, a product may have flame retardancy to have self-extinguishing property in case of fire.

Also, a product may have excellent impact strength by using a core-shell type elastomer.

BRIEF DESCRIPTION OF THE DRAWINGS

These and/or other aspects of the invention will become apparent and more readily appreciated from the following description of the embodiments, taken in conjunction with the accompanying drawings of which.

BEST MODE

Reference will now be made in detail to the embodiments of the present disclosure, examples of which are illustrated in the accompanying drawings, wherein like reference numerals refer to like elements throughout.

Hereinafter, embodiments of the present disclosure will be described in detail with reference to the drawings.

A polymer composition according to an embodiment includes a thermoplastic resin including polycarbonate, a post-consumer material (PCM) resin, a bio-based resin and a core-shell type elastomer.

The thermoplastic resin is a resin repeatedly melted and reshaped by heating after being molded, and the polymer composition according to an embodiment may include 45 to 60% by weight of the thermoplastic resin.

The thermoplastic resin may include polycarbonate. Polycarbonate may include at least one of a low molecular weight polycarbonate and a high molecular weight polycarbonate, for example, 0 to 5% by weight of the low molecular weight polycarbonate and 45 to 55% by weight of the high molecular weight polycarbonate.

The high molecular weight polycarbonate may have a melt index of 45 g/10 min or less (300° C., 1.2 kg), and the low molecular weight polycarbonate may have a melt index greater than 45 g/10 min (300° C., 1.2 kg).

A polycarbonate resin, as a commercialized thermoplastic resin, may be synthesized using bisphenol A. The polycarbonate resin is transparent and has excellent mechanical properties, and an article molded of the polymer composition according to an embodiment may have impact resistance. Also, the polycarbonate resin has self-extinguishing property and may provide an article molded of the polymer composition according to an embodiment with heat resistance and flame retardancy.

The post-consumer material (PCM) refers to a finished product that has served its intended use and has been discarded for disposal or recovery and may also be referred to as a post-consumer resin (PCR) material. Hereinafter, the terms PCM and PCR material may be used interchangeably. Throughout the specification, the PCM may be used to as a concept including PCR materials.

The PCM resin is a thermoplastic resin synthesized using a recycled material as a raw material. The polymer composition according to an embodiment may include 1 to 20% by weight of the PCM resin.

The PCM resin may include PCM polycarbonate. The PCM polycarbonate is a recycled material of polycarbonate. The polymer composition may have eco-friendly properties by using the recycled material of PCM polycarbonate.

More particularly, it is known that 4 kg of carbon dioxide ($CO_2$) is released to manufacture 1 kg of PCM polycarbonate while 5 kg of $CO_2$ is released to manufacture 1 kg of polycarbonate. That is, a generation amount of $CO_2$ may be reduced by using the PCM polycarbonate resin according to an embodiment, and the polymer composition according to an embodiment may be more eco-friendly.

The bio-based resin that is a biodegrading polymer resin is a universal polymer resin widely applicable to various industrial fields such as medicine, food, disposable products, coating technology. The bio-based resin may include resins extracted from corn for industrial purposes. The polymer composition according to an embodiment may include 1 to 20% by weight of the bio-based resin.

The bio-based resin may include at least one selected from the group consisting of poly(cyclohexylene dimethylene terephthalate)glycol (PCTG) and poly(ethylene terephthalate)glycol (PETG) which will be referred to as PCTG and PETG hereinafter for descriptive convenience.

The bio-based resin preventing a rapid increase in viscosity of the polymer composition may replace the low molecular weight polycarbonate and provide eco-friendliness to the polymer composition and an article molded of the polymer composition according to an embodiment.

For example, flowability of the polymer composition may be increased by adding PCTG to the polymer composition, and an article may be more efficiently injection-molded using the polymer composition.

The elastomer that is a polymer material having rubber elasticity at room temperature may be reversibly transformed by several hundred percent very quickly. The polymer composition according to an embodiment may include the core-shell type elastomer.

The core-shell type elastomer may have a core layer including at least one selected from the group consisting of butadiene and a butylacrylate-styrene copolymer, and a shell layer including polymethylmethacrylate (PMMA).

The core-shell type elastomer may provide impact resistance to the polymer composition and an article molded of the polymer composition. More particularly, since a bio-based material or a PCM resin may increase flexibility or softness of a polycarbonate resin, reliability may be increased in tensile strength tests, Izod notched impact strength tests, or drop hammer tests, which will be described later, by adding the core-shell type elastomer thereto.

The polymer composition according to an embodiment may include 5 to 15% by weight of the core-shell type elastomer. If the polymer composition includes an insufficient amount of the core-shell type elastomer, dispersibility of the elastomer may decrease in the polymer composition, and thus effects of improving impact resistance are negligible. On the contrary, if the polymer composition includes an excess of the core-shell type elastomer, molding efficiency may decrease due to high viscosity. Thus, the amount of the core-shell type elastomer needs to be appropriately controlled in the polymer composition according to an embodiment.

The polymer composition according to an embodiment may have an elongation of 110% or greater.

In addition, the polymer composition according to an embodiment may have a flame retardancy level of V2 or higher under the Underwriters Laboratory (UL) 94 standard, which is an international plastics flammability standard. The polymer composition according to an embodiment may have flame retardancy beyond V2 level by using polycarbonate as the thermoplastic resin.

In addition, the polymer composition according to an embodiment may have a heat distortion temperature (HDT) of 100° C. or greater. The polymer composition may have reliability of heat distortion temperature by using polycarbonate as the thermoplastic resin.

The polymer composition according to an embodiment may have a melt index of 15 g/10 min or greater (300° C., 1.2 kg). The melt index is a melt flow rate of a molten material extruded by a piston under given conditions indicating the degree of ease of flow of the molten material. As the melt index increases, the material may be easily shaped as a thin film. The polymer composition according to an embodiment may have excellent melt flowability by using the PCM resin or the low molecular weight polycarbonate.

The polymer composition according to an embodiment may have an Izod notched impact strength of 60 kgfcm/cm or greater. The Izod notched impact strength test is a method of testing impact strength of a material. The polymer composition according to an embodiment may have a high Izod notched impact strength by using the core-shell type elastomer.

Also, the polymer composition according to an embodiment may further include an additive. The additive may include at least one selected from the group consisting of a wax, a wax type master batch, a heat stabilizer, a UV stabilizer, an antioxidant stabilizer, a deodorant, and a surface stabilizer.

The wax that is a semi-solid lubricant may prevent heat generation caused by mixing materials to manufacture molded articles. By adding the wax to a composition, temperature may be controlled during a manufacturing process.

The wax type master batch is a mixture of a rubber raw material and a wax. If a wax is added to a composition alone, the wax may not be uniformly mixed with the composition. Thus, the wax may be uniformly dispersed in the composition by using the wax type master batch.

The heat stabilizer, the UV stabilizer, and the antioxidant stabilizer are chemicals added to prevent or inhibit deterioration of a resin. The polymer composition according to an embodiment includes a plastic component such as polycarbonate. Since the plastic component deteriorates by heat, light, or oxygen, the deterioration needs to be prevented. Thus, the polymer composition according to an embodiment may prevent deterioration of the resin by adding the heat stabilizer, the UV stabilizer, or the antioxidant stabilizer thereto, if required.

The deodorant is an additive used to minimize gas generation while manufacturing injection-molded products using a polymer composition. The polymer composition according to an embodiment or an article molded thereof may include a deodorant to obtain reliability while depositing a coating material.

The surface stabilizer is an additive used to make the surface of an article molded from a polymer composition smooth. The polymer composition according to an embodiment may include a surface stabilizer.

The polymer composition according to an embodiment has been described above. The types and composition ratios of the polymer composition are not limited to those described above and may include modifications obvious to one of ordinary skill in the art.

Next, a molded article according to an embodiment will be described.

The molded article according to an embodiment includes a polymer composition including a thermoplastic resin including polycarbonate, a post-consumer material (PCM) resin, a bio-based resin, and a core-shell type elastomer.

The article may be molded in the shape of film, sheet, pellet, or fiber and may include an interior material or an exterior material of an electronic device.

The electronic device may include at least one selected from the group consisting of a smart device, a display apparatus, a computer, a monitor, a tablet PC, a printer, a multifunctional apparatus, a refrigerator, a washing machine, an air conditioner, a camera, an E-BOOK, E-Paper, 3D glasses, and a battery charger.

Hereinafter, a smart device will be described as an example of the molded article.

Figure 1:
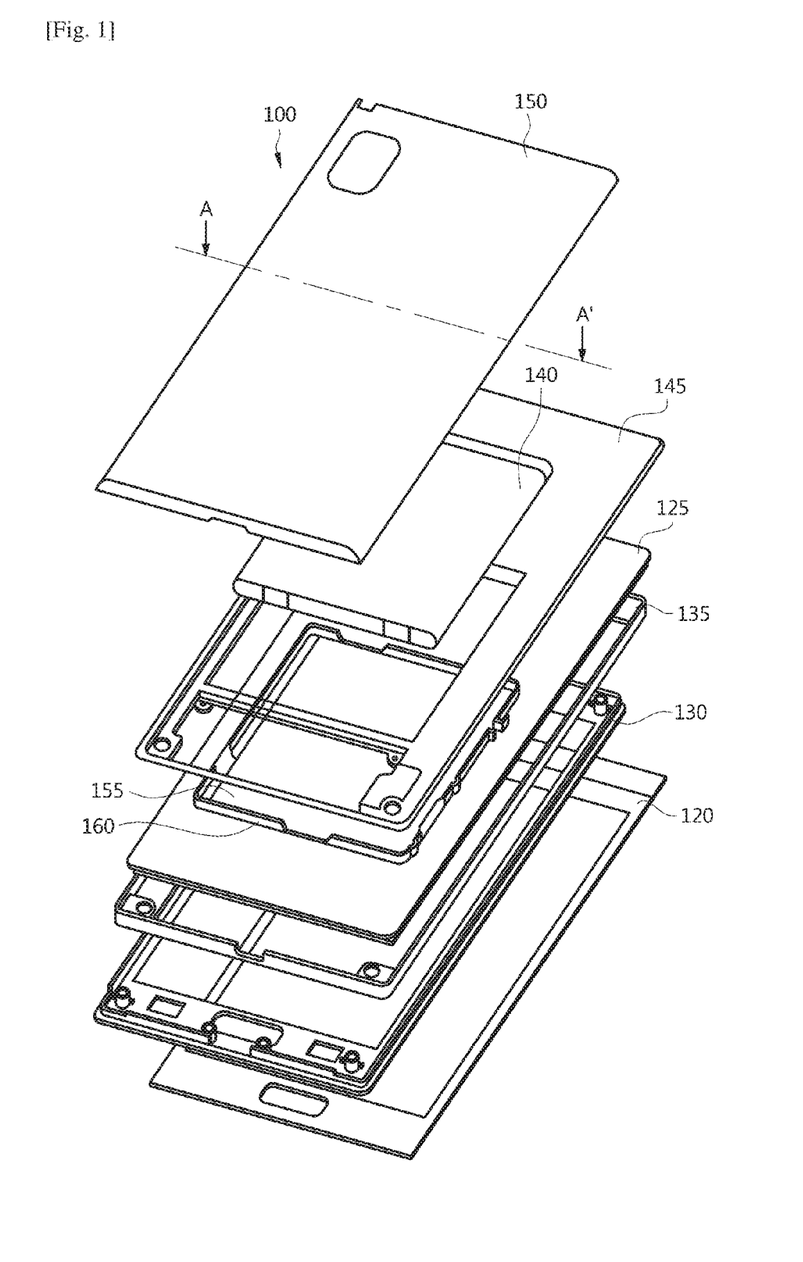
FIG. 1 is an exploded perspective view of a smart device as a molded article.
Figure 2:
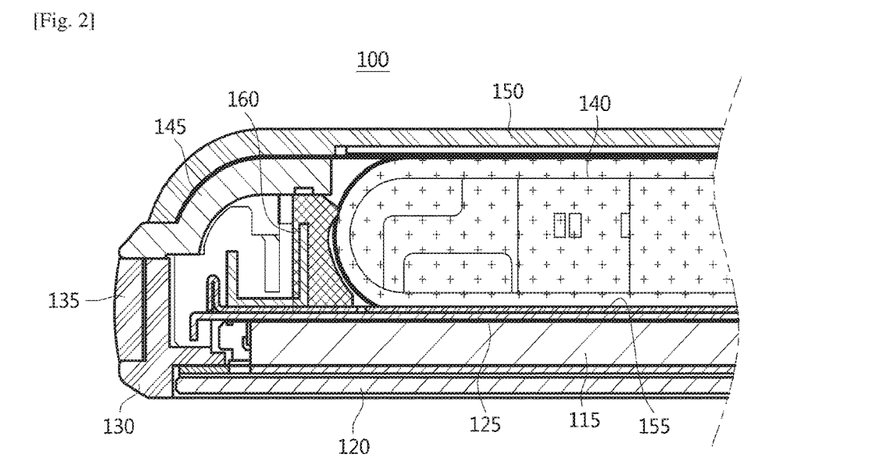
FIG. 2 is a cross-sectional view of the smart device of FIG. 1 taken along line AA'.

FIG. 1 is an exploded perspective view of a smart device as a molded article. FIG. 2 is a cross-sectional view of the smart device of FIG. 1 taken along line AA'.

Referring to FIGS. 1 and 2, a smart device 100 includes a display module 115, a window glass 120 mounted on a front surface of the display module 115, a frame 125 mounted on a rear surface of the display module 115, a front cover 130 surrounding edges of the display module 115 and the window glass 120, a front decoration 135 surrounding an outer circumferential surface of the front cover 130, a battery 140 mounted on a rear surface of the frame 125, a rear cover 145 disposed on the rear surface of the frame 125, and a battery cover 150 covering the rear cover 145 and the battery 140.

More particularly, the rear cover 145 may have a battery hole into which the battery 140 is inserted. Thus, the battery 140 may be mounted on the rear surface of the frame 125 through the battery hole. Also, the frame may have a battery mount part 155, and a guide rib 160 may be formed to surround edges of the battery mount part 155. The guide rib 160 defines a mount region of the battery 140, and the guide rib 160 may be formed along the edges of the battery hole of the rear cover 145. In addition, various electronic parts may be disposed on an upper portion of the rear cover 145, and the battery 140 may be disposed on a lower portion of the rear cover 145.

The molded article according to an embodiment may include the frame 125, the front cover 130, the front decoration 135, the rear cover 145, and the battery 150 of the smart device 100 illustrated in FIGS. 1 and 2. However, applications of the molded article are not limited to those of the smart device 100. The molded article according to an embodiment may also include modifications within a range obvious to one of ordinary skill in the art including a home key and a button of the smart device.

Next, a display apparatus 200 will be described as another example of the molded article.

Figure 3:
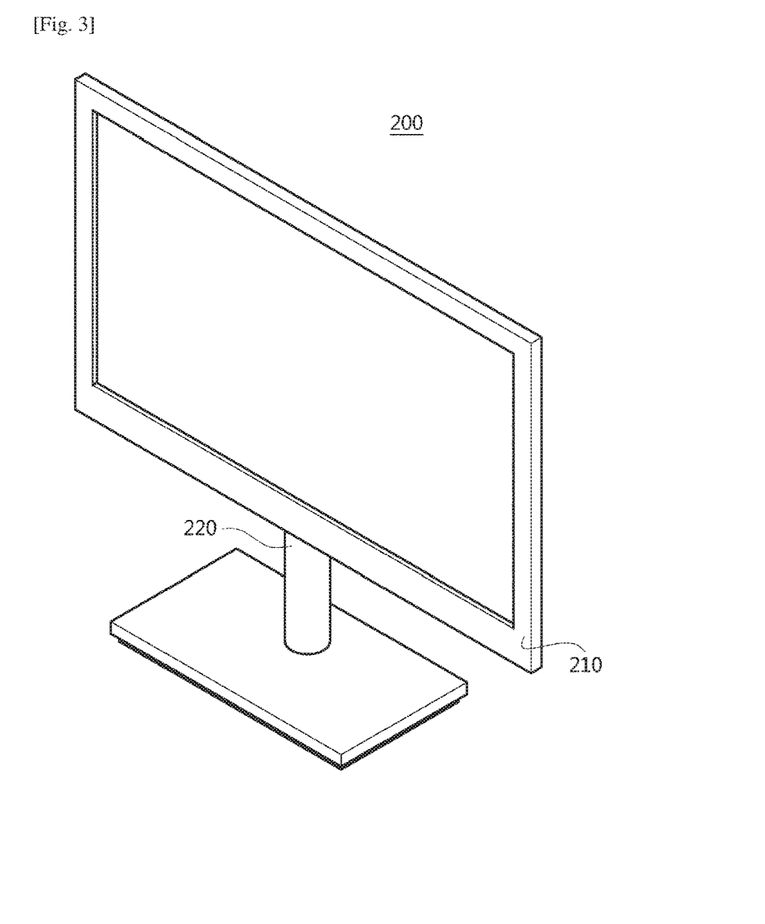
FIG. 3 is a perspective view of the display apparatus as the molded article.

FIG. 3 is a perspective view of the display apparatus 200 as the molded article.

Referring to FIG. 3, the display apparatus 200 may include a main body 210 configured to display an image and output sounds, and a stand 220 configured to support the main body 210.

The main body 210 and the stand 220 of the display apparatus 200 according to an embodiment may include the polymer composition described above. That is, the main body 210 and the stand 220 may be molded articles manufactured by injection-molding the polymer composition. However, applications of the molded article are not limited to those of the display apparatus 200. The molded article according to an embodiment may also include modifications within a range obvious to one of ordinary skill in the art including interior materials of the display apparatus 200.

The molded article including the polymer composition according to an embodiment has been described.

Next, a method of manufacturing the molded article according to an embodiment will be described.

Figure 4:
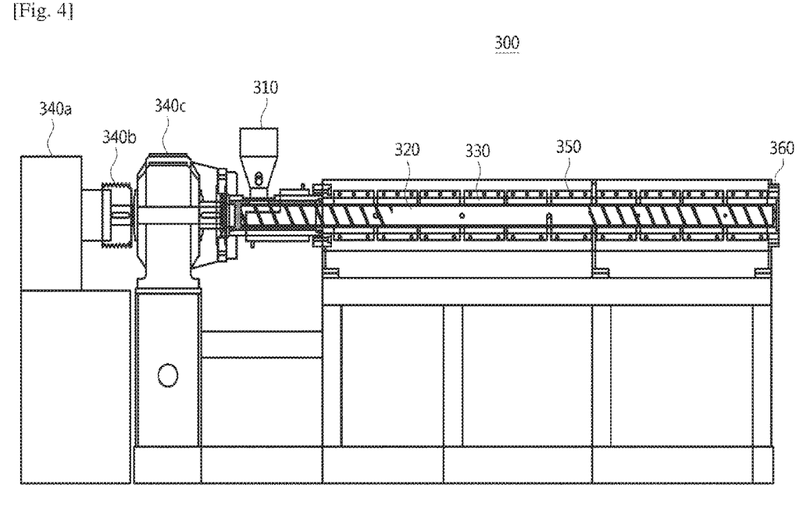
FIG. 4 is a view illustrating a structure of an extruder according to an embodiment.
Figure 5:
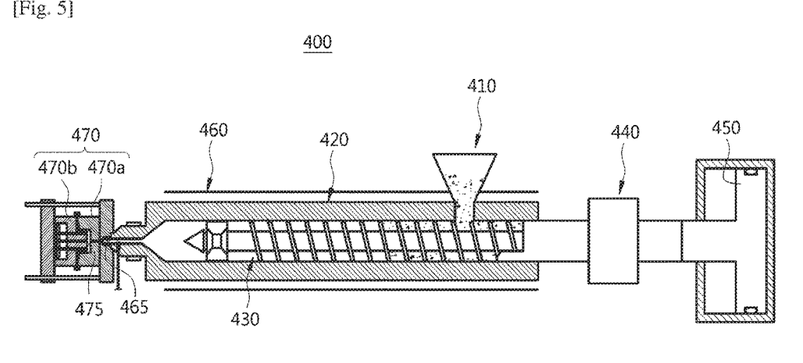
FIG. 5 is a view illustrating a structure of an injection-molding apparatus according to an embodiment.

First, a structure of an extruder used to prepare the polymer composition according to an embodiment and a structure of an injection-molding apparatus used to manufacture the molded article using the polymer composition prepared by the extruder as a raw material will be described. FIG. 4 is a view illustrating a structure of an extruder 300 according to an embodiment. FIG. 5 is a view illustrating a structure of an injection-molding apparatus 400 according to an embodiment.

Referring to FIG. 4, the extruder 300 according to an embodiment may include an extruder hopper 310 to feed raw materials, a shaft 320 rotatably installed, an extruder cylinder 330 surrounding the shaft 320, extruder drive units 340a, 340b, and 340c to rotate the shaft 320, an extruder heater 350 to heat the inside of the extruder cylinder 330, a discharge die 360 to discharge the polymer composition, and an extruder controller (not shown) to control a heating temperature of the extruder heater 350. The extruder 300 may be a continuous flow single screw extruder as illustrated in FIG. 4. However, the extruder 300 is not limited thereto and may also be a continuous flow twin screw extruder.

The extruder drive units 340a, 340b, and 340c may include a motor 340a to rotatably drive the shaft 320, a coupling part 340b connected to the motor 340a and transporting power of the motor 340a to a gear part 340c, and the gear part 340c to receive power of the motor 340a and rotate the shaft 320. The shaft 320 driven by the extruder drive units 340a, 340b, and 340c may rotate in a predetermined direction (e.g., clockwise direction) to apply a shear stress to a molten mixture at a speed of 100 to 400 rpm.

The extruder heater 350 may include a plurality of heaters disposed from a feeding portion to a discharging portion to control the internal temperature of the extruder cylinder 330. That is, the inside of the extruder cylinder 330 may be partitioned into a plurality of sections, temperatures of which are controlled respectively. The temperature of each section may be appropriately controlled in accordance with the raw material processed therein.

Referring to FIG. 5, the injection-molding apparatus 400 according to an embodiment may include an injection-molding apparatus hopper 410 to feed raw materials, a barrel 420 to accommodate the raw materials introduced through the injection-molding apparatus hopper 410, a screw installed in the barrel 420 to move forward and backward and rotate, an injection-molding apparatus motor 440 to transmit a rotational force to the screw 430, an injection-molding apparatus cylinder 450 connected to the screw 430 to linearly move the screw 430, an injection-molding apparatus heater 460 installed on an outer circumferential surface of the barrel 420 to heat the raw materials accommodated in the barrel 420, a nozzle 465 to supply the raw materials for a synthetic resin accommodated in the barrel 420 into a mold 470, and the mold 470 to receive the raw materials from the nozzle 465 and shape an article.

The mold 470 may include a first mold 470a to receive the raw materials and a second mold 470b coupled to the first mold 470a to constitute an injection-molding cavity 475 therein. The first mold 470a may be a fixed mold, and the second mold 470b may be a movable mold.

The extrude 300 and the injection-molding apparatus 400 to manufacture the molded article according to an embodiment have been described above. Next, a method of manufacturing the molded article according to an embodiment will be described.

The method of manufacturing the molded article according to an embodiment may include: preparing a polymer composition by extruding a composition including a thermoplastic resin having polycarbonate, a PCM resin, a bio-based resin, and a core-shell type elastomer (hereinafter, referred to as raw materials); and injection-molding the polymer composition.

The extruding of the raw materials may include premixing the raw materials by using a mixer, feeding the mixed raw materials into the extruder hopper 310, melting the introduced raw materials, and dispersing the molten raw materials by applying a shear stress thereto. The method may further include drying the raw materials discharged from the discharge die 360.

The injection-molding of the polymer composition may include feeding the polymer composition into the injection-molding apparatus hopper 410, melting the introduced polymer composition, and supplying the molten polymer composition into the mold 470.

Hereinafter, preparations examples of the battery cover 150 and the rear cover 145 of the smart device will be described as examples of the molded article for descriptive convenience.

PREPARATION EXAMPLE 1

First, a high molecular weight polycarbonate, a low molecular weight polycarbonate, a PCM polycarbonate, PCTG, a core-shell type elastomer, a wax type master batch, a heat stabilizer, a UV stabilizer, and other additives were premixed by using a mixer (not shown) to manufacture a battery cover 150 of a smart device. Then, these raw materials were fed into the extruder hopper 310 illustrated in FIG. 4. Then, the raw materials, which were extruded in the extruder cylinder 330 and discharged from the discharge die 360, were dried at a temperature of 90 to 100° C. for 3 to 4 hours to prepare a polymer composition.

Table 1 shows preparation conditions of the polymer composition as a raw material of the battery cover 150 according to an embodiment and will be described later.

TABLE 1

| Temperature of extruder cylinder (° C.) | first section (extruder hopper) | 245 |
|---|---|---|
| | second section | 250 |
| | third section | 255 |
| | fourth section | 260 |
| | fifth section | 265 |
| | sixth section | 270 |
| | seventh section (discharge die) | 275 |

As shown in Table 1, according to the present preparation example, the extruder cylinder 330 was partitioned into a plurality of sections, and temperatures of the sections were respectively controlled. More particularly, the temperature of the extruder cylinder 330 around the extruder hopper 310 was controlled at 245° C. and the temperature of the extruder cylinder 330 around the discharge die 360 was controlled at 275° C.

Then, the polymer composition was fed into the injection-molding apparatus hopper 410 illustrated in FIG. 5 and injection-molded by using a battery cover mold of the smart device, thereby manufacturing the battery cover 150.

Table 2 shows injection-molding conditions for injection-molding of the battery cover 150 of the smart device and will be described later.

TABLE 2

| Temperature of barrel (° C.) | first section (nozzle) | 285 |
|---|---|---|
| | second section | 285 |
| | third section | 275 |
| | fourth section (injection-molding apparatus hopper) | 260 |
| Temperature of mold (° C.) | first mold | 90 |
| | second mold | 110 |

As shown in Table 2, according to the present preparation example, the barrel 420 was partitioned into a plurality of sections, and temperatures of the sections were controlled in a stepwise manner. More particularly, the raw materials were supplied into the mold 470 by controlling the temperature of the barrel 420 around the nozzle 465 at 285° C. and the temperature of the barrel 420 around the injection-molding apparatus hopper 410 at 260° C. The temperature of the first mold 470a, as the fixed mold, was controlled at 90° C., and the temperature of the second mold 470b, as the movable mold, was controlled at 110° C.

PREPARATION EXAMPLE 2

A polymer composition was prepared in the same manner as in Preparation Example 1 to prepare a rear cover 145 of a smart device.

Then, the polymer composition was fed into the injection-molding apparatus hopper 410 illustrated in FIG. 5 and injection-molded by using a rear cover mold of the smart device to manufacture the rear cover 145.

Table 3 shows injection-molding conditions for injection-molding of the rear cover 145 of the smart device and will be described later.

TABLE 3

| Temperature of barrel (° C.) | first section (nozzle) | 295 |
|---|---|---|
| | second section | 290 |
| | third section | 285 |
| | fourth section (injection-molding apparatus hopper) | 280 |
| Temperature of mold (° C.) | first mold | 80 |
| | second mold | 80 |

As shown in Table 3, according to the present preparation example, the raw materials were fed into the mold by controlling the temperature of the barrel 420 around the nozzle 465 at 295° C. and the temperature of the barrel 420 around the injection-molding apparatus hopper 410 at 280° C. Also, the temperature of the first mold 470a, as the fixed mold, was controlled at 80° C., and the temperature of the second mold 470b, as the movable mold, was controlled at 80° C.

Referring to Tables 2 and 3, it was confirmed that the temperature of the mold 470 to prepare the battery cover 150 of the smart device needs to be controlled higher than that to prepare the rear cover 145 of the smart device. Since the thickness of the battery cover 150 of the smart device is less than that of the rear cover 145 of the smart device, the temperature of the mold 470 to prepare the battery cover 150 needs to be controlled higher to reduce viscosity of the fed raw materials.

That is, the temperatures of the mold 470 and the barrel 420 may be controlled differently depending on the types of the article to be molded.

The method of manufacturing the molded article according to an embodiment has been described above. However, preparation examples of the molded article are not limited thereto and may also be modified within a range obvious to one of ordinary skill in the art.

Next, test results of physical properties of specimens formed of polymer compositions prepared according to the following examples and comparative examples will be described to aid in better understanding of the present disclosure. However, the present disclosure is not limited to the following examples.

EXAMPLE 1

A specimen formed of a polymer composition according to Example 1 includes 44% by weight of a high molecular weight polycarbonate, 5% by weight of a low molecular weight polycarbonate, 20% by weight of a PCM polycarbonate, 20% by weight of PCTG, 6% by weight of a core-shell type elastomer, 5% by weight of a wax type master batch, 0.2 phr of a heat stabilizer, and 0.2 phr of a UV stabilizer. Hereinafter, the phr is defined as a part per hundred relative to 100% by weight of the total composition.

EXAMPLE 2

A specimen formed of a polymer composition according to Example 2 includes 49% by weight of the high molecular weight polycarbonate, 20% by weight of the PCM polycarbonate, 20% by weight of PCTG, 6% by weight of the core-shell type elastomer, 5% by weight of the wax type master batch, and 0.2 phr of the UV stabilizer.

EXAMPLE 3

A specimen formed of a polymer composition according to Example 3 includes 45% by weight of the high molecular weight polycarbonate, 20% by weight of the PCM polycarbonate, 20% by weight of PCTG, 10% by weight of the core-shell type elastomer, 5% by weight of the wax type master batch, and 0.2 phr of the UV stabilizer.

EXAMPLE 4

A specimen formed of a polymer composition according to Example 4 includes 40% by weight of the high molecular weight polycarbonate, 20% by weight of the PCM polycarbonate, 20% by weight of PCTG, 15% by weight of the core-shell type elastomer, 5% by weight of the wax type master batch, and 0.2 phr of the UV stabilizer.

COMPARATIVE EXAMPLE 1

A specimen formed of a polymer composition according to Comparative Example 1 includes 25% by weight of the high molecular weight polycarbonate, 30% by weight of the low molecular weight polycarbonate, 20% by weight of the PCM polycarbonate, 20% by weight of PCTG, 5% by weight of the wax type master batch, 0.2 phr of the heat stabilizer, and 0.2 phr of the UV stabilizer.

COMPARATIVE EXAMPLE 2

A specimen formed of a polymer composition according to Comparative Example 2 includes 25% by weight of the high molecular weight polycarbonate, 25% by weight of the low molecular weight polycarbonate, 20% by weight of the PCM polycarbonate, 20% by weight of PCTG, 5% by weight of the core-shell type elastomer, 5% by weight of the wax type master batch, 0.2 phr of the heat stabilizer, and 0.2 phr of the UV stabilizer.

COMPARATIVE EXAMPLE 3

A specimen formed of a polymer composition according to Comparative Example 3 includes 26% by weight of the high molecular weight polycarbonate, 20% by weight of the low molecular weight polycarbonate, 20% by weight of the PCM polycarbonate, 20% by weight of PCTG, 8% by weight of the core-shell type elastomer, 6% by weight of the wax type master batch, 0.2 phr of the heat stabilizer, and 0.2 phr of the UV stabilizer.

COMPARATIVE EXAMPLE 4

A specimen formed of a polymer composition according to Comparative Example 4 includes 25.9% by weight of the high molecular weight polycarbonate, 24% by weight of the low molecular weight polycarbonate, 20% by weight of the PCM polycarbonate, 20% by weight of PCTG, 5% by weight of the core-shell type elastomer, 5% by weight of the wax type master batch, 0.1% by weight of a wax, 0.2 phr of the heat stabilizer, and 0.2 phr of the UV stabilizer.

COMPARATIVE EXAMPLE 5

A specimen formed of a polymer composition according to Comparative Example 5 includes 43% by weight of the high molecular weight polycarbonate, 6% by weight of the low molecular weight polycarbonate, 20% by weight of the PCM polycarbonate, 20% by weight of PCTG, 6% by weight of the core-shell type elastomer, 5% by weight of the wax type master batch, 0.2 phr of the heat stabilizer, and 0.2 phr of the UV stabilizer.

COMPARATIVE EXAMPLE 6

A specimen formed of a polymer composition according to Comparative Example 6 includes 36% by weight of the high molecular weight polycarbonate, 3% by weight of the low molecular weight polycarbonate, 20% by weight of the PCM polycarbonate, 20% by weight of PCTG, 16% by weight of the core-shell type elastomer, 5% by weight of the wax type master batch, and 0.2 phr of the UV stabilizer.

Table 4 shows composition ratios of the polymer compositions according to Examples 1 to 4 and Comparative Examples 1 to 6.

TABLE 4

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Resin (wt %) | High molecular weight polycarbonate | 44 | 49 | 45 | 40 | 25 | 25 | 26 | 25.9 | 43 | 36 |
| | Low molecular weight polycarbonate | 5 | 0 | 0 | 0 | 30 | 25 | 20 | 24 | 6 | 3 |
| | PCM polycarbonate | 20 | 20 | 20 | 20 | 20 | 20 | 20 | 20 | 20 | 20 |
| | PCTG | 20 | 20 | 20 | 20 | 20 | 20 | 20 | 20 | 20 | 20 |
| Core-shell type elastomer (wt %) | | 6 | 6 | 10 | 15 | 0 | 5 | 8 | 5 | 6 | 16 |
| Wax type master batch (wt %) | | 5 | 5 | 5 | 5 | 5 | 5 | 6 | 5 | 5 | 5 |
| Wax (wt %) | | 0 | 0 | 0 | 0 | 0 | 0 | 0 | 0.1 | 0 | 0 |
| Heat stabilizer (phr) | | 0.2 | 0 | 0 | 0 | 0.2 | 0.2 | 0.2 | 0.1 | 0.2 | 0 |
| UV stabilizer (phr) | | 0.2 | 0.2 | 0.2 | 0.2 | 0.2 | 0.2 | 0.2 | 0.1 | 0.2 | 0.2 |
| Deodorant (phr) | | 0 | 0 | 0 | 0 | 0 | 0 | 0 | 0.5 | 0 | 0 |
| Surface stabilizer (phr) | | 0 | 0 | 0 | 0 | 0 | 0 | 0 | 0.2 | 0 | 0 |

TEST EXAMPLE 1

Evaluation of Basic Physical Properties

Physical properties of the specimens formed of the polymer compositions according to Examples 1 to 4 and Comparative Examples 1 to 6 were evaluated according to the following methods.

Melt Index (MI)

Melt indices (MI) of the specimens formed of the polymer compositions according to Examples 1 to 4 and Comparative Examples 1 to 6 were measured under the conditions of 1.2 kg and 300° C.

Specific Gravity

Specific gravities of the specimens formed of the polymer compositions according to Examples 1 to 4 and Comparative Examples 1 to 6 were measured.

Heat Distortion Temperature (HDT)

Heat distortion temperatures of the specimens formed of the polymer compositions according to Examples 1 to 4 and Comparative Examples 1 to 6 cut to a size of 127×12.7×6.4 mm were measured under a stress of 1.8 MPa according to American Society for Testing and Materials (ASTM) D648 testing methods.

Flame Retardancy

Flame retardancies of the specimens formed of the polymer compositions according to Examples 1 to 4 and Comparative Examples 1 to 6 were measured according to the UL-94 standard at t=3.2 cm.

TEST EXAMPLE 2

Evaluation of Mechanical Properties

Mechanical properties of the specimens formed of the polymer compositions according to Examples 1 to 4 and Comparative Examples 1 to 6 were evaluated according to the following methods.

Flexural Rigidity and Flexural Modulus

Flexural rigidities of the specimens formed of the polymer compositions according to Examples 1 to 4 and Comparative Examples 1 to 6 were measured according to ASTM D790 standard testing methods.

Impact Strength

Impact strengths of the specimens formed of the polymer compositions according to Examples 1 to 4 and Comparative Examples 1 to 6 were measured according to ASTM D256 testing methods.

Tensile Strength

Tensile strengths of the specimens formed of the polymer compositions according to Examples 1 to 4 and Comparative Examples 1 to 6 were measured according to ASTM D638 testing methods.

Elongation

Elongations of the specimens formed of the polymer compositions according to Examples 1 to 4 and Comparative Examples 1 to 6 were measured according to ASTM D638 testing methods.

Drop Hammer Test

A weight of 500 g was dropped onto the specimens formed of the polymer compositions according to Examples 1 to 4 and Comparative Examples 1 to 6 from a height of 50 cm.

TEST EXAMPLE 3

Evaluation of Other Properties

Other properties of the specimens formed of the polymer composition prepared according to Examples 1 to 4 and Comparative Examples 1 to 6 were measured according to the following methods.

Cosmetics Resistance

Nivea Aqua Protect Sun Spray (SPF30, PA++) was applied to coated surfaces of the specimens formed of the polymer compositions according to Examples 1 to 4 and Comparative Examples 1 to 6 and maintained under the conditions of 80° C./80%. After 24 hours, the specimens were washed, dried, and maintained at room temperature for 4 hours. Then, the specimens were cross-cut at intervals of 2 mm and peeled once by using a tape.

High Temperature and High Humidity

The specimens formed of the polymer compositions according to Examples 1 to 4 and Comparative Examples 1 to 6 were maintained under the conditions of 50° C./95% for 72 hours. After maintaining the specimens at room temperature for 4 hours, the specimens were cross-cut at intervals of 2 mm and peeled once by using a tape.

Deposition Coating

A primer, a base coat, UV treatment, tin (Sn), an intermediate coat, a top coat, and UV treatment were sequentially applied to the specimens formed of the polymer compositions according to Examples 1 to 4 and Comparative Examples 1 to 6.

Thermal Shock

The specimens formed of the polymer compositions according to Examples 1 to 4 and Comparative Examples 1 to 6 were maintained at −40° C. for 1 hour and at 85° C. for 1 hour. This process was repeated 30 cycles and the specimens were maintained at room temperature for 4 hours. Then, the specimens were cross-cut at intervals of 2 mm and peeled once by using a tape.

Physical properties measured according to the methods described above are shown in Table 5 below.

TABLE 5

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Melt index (g/10 cm) @300° C., 1.2 kg | 29.3 | 26.7 | 24.5 | 24.0 | 54.6 | 50.4 | 43.0 | 50.3 | 43 | 36 |
| Specific gravity (g/cm$^3$) | 1.218 | 1.228 | 1.240 | 1.245 | 1.208 | 1.197 | 1.186 | 1.191 | 1.229 | 1.245 |

TABLE 5-continued

|  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Heat distortion temperature (° C.) | 115 | 115 | 115 | 115 | 105 | 105 | 105 | 105 | 113 | 116 |
| Flame retardancy | V-2 | V-2 | V-2 | V-2 | V-2 | V-2 | V-2 | V-2 | V-2 | V-2 |
| Flexural rigidity (Kgf/cm$^2$) | 768 | 765 | 763 | 764 | 843 | 760 | 726 | 759 | 761 | 780 |
| Flexural modulus (kgf/cm$^2$) | 20,569 | 20,503 | 20,478 | 20,453 | 21,446 | 20,044 | 19,218 | 20,032 | 20,415 | 20,925 |
| Izod notched impact strength (kgfcm/cm) | 64 | 65 | 68 | 70 | 11 | 58 | 52 | 58 | 60 | 58 |
| Izod un-notched impact strength (kgfcm/cm) | 145 | 148 | 148 | 150 | 136 | 136 | 140 | 137 | 140 | 142 |
| Tensile strength (kgf/cm$^2$) | 620 | 595 | 566 | 520 | 596 | 550 | 522 | 551 | 615 | 618 |
| Elongation (%) | 110 | 155 | 198 | 204 | 80 | 84 | 84 | 85 | 95 | 105 |
| Drop hammer test | pass | pass | pass | pass | fail | fail | fail | fail | fail | fail |
| Cosmetics resistance | pass | pass | pass | pass | fail | fail | fail | fail | pass | pass |
| High temperature high humidity | pass | pass | pass | pass | pass | pass | pass | pass | pass | pass |
| Deposition coating | pass | pass | pass | pass | pass | pass | pass | pass | pass | pass |
| Thermal shock | pass | pass | pass | pass | pass | pass | pass | pass | pass | pass |

Referring to Table 5, the specimen according to Comparative Example 1 had a melt index of 54.6 g/10 cm indicating high flowability and a high flexural rigidity of 843 (Kgf/cm$^2$), but a very low Izod notched impact strength of 11 kgfcm/cm. Also, the specimen according to Comparative Example 1 failed the drop hammer test and the cosmetics resistance test.

Thus, according to Comparative Examples 2 and 4, the tests were performed using reduced amounts of the low molecular weight polycarbonate. As a result, although the Izod notched impact strength was increased to 52 to 58 kgfcm/cm, the specimens according to Comparative Examples 2 and 4 also failed the drop hammer test and the cosmetics resistance test as the specimen according to Comparative Example 1.

Figure 6:
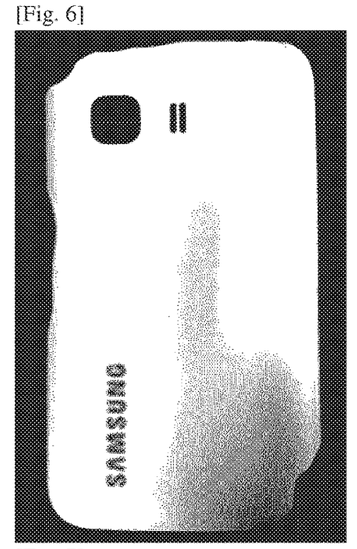
FIG. 6 illustrates a drop hammer test result of a battery cover of a smart device manufactured using the specimens according to Comparative Examples 2 to 4.
Figure 7:
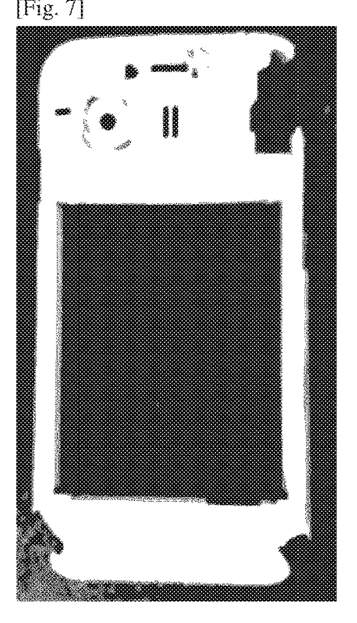
FIG. 7 illustrates a drop hammer test result of a rear cover of a smart device manufactured using the specimens according to Comparative Examples 2 to 4.

FIG. 6 illustrates a drop hammer test result of a battery cover of a smart device manufactured using the specimens according to Comparative Examples 2 to 4. FIG. 7 illustrates a drop hammer test result of a rear cover of a smart device manufactured using the specimens according to Comparative Examples 2 to 4.

As illustrated in FIGS. 6 and 7, notches were observed in the battery cover and the rear cover of the smart device manufactured using the polymer compositions according to Comparative Examples 2 to 4 by the drop hammer test. That is, the specimens formed of the polymer compositions according to Comparative Examples 2 to 4 cannot have reliable results in the drop hammer test.

Also, the specimens according to Comparative Examples 1 to 3 were tested by gradually decreasing the amount of the low molecular weight polycarbonate and increasing the amount of the core-shell type elastomer to 0, 5, and 8% by weight. Thus, it was confirmed that the Izod notched impact strength was improved, but the Izod un-notched impact strength was not improved, as the amount of the low molecular weight polycarbonate decreases. On the contrary, the Izod un-notched impact strength increased from 136 kgfcm/cm to 140 kgfcm/cm by the core-shell type elastomer.

Comparative Example 5 was performed to determine a lower limit of the low molecular weight polycarbonate. If the low molecular weight polycarbonate was used in an amount of 6% by weight, a higher Izod notched impact strength of 60 kgfcm/cm was obtained than those of Comparative Examples 1 to 4, but no reliable result was obtained in the drop hammer test.

Comparative Example 6 was performed to determine an upper limit of the core-shell type elastomer. If the core-shell type elastomer was used in an amount of 16% by weight, a relatively lower Izod notched impact strength of 58 kgfcm/cm and a relatively lower Izod un-notched impact strength of 142 kgfcm/cm were obtained.

Based on comprehensive considerations of the results above, the low molecular weight polycarbonate was used in an amount of 5% by weight or less, and the core-shell type elastomer was used in an amount of 6 to 15% by weight in the polymer compositions according to Examples 1 to 4. It was confirmed that the specimens according to Examples 1 to 4 had Izod notched impact strengths of 64 to 70 kgfcm/cm, and Izod un-notched impact strengths of 145 to 150 kgfcm/cm. Also, it was confirmed that the specimens according to Examples 1 to 4 had elongations of 110 to 204%, which were greater than those of the specimens according to Comparative Examples 1 to 6, and had excellent results in the drop hammer test and cosmetic resistance test.

Figure 8:
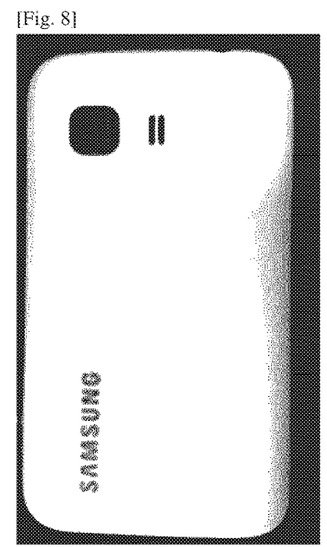
FIG. 8 illustrates a drop hammer test result of a battery cover manufactured using the specimens according to Examples 1 to 4.
Figure 9:
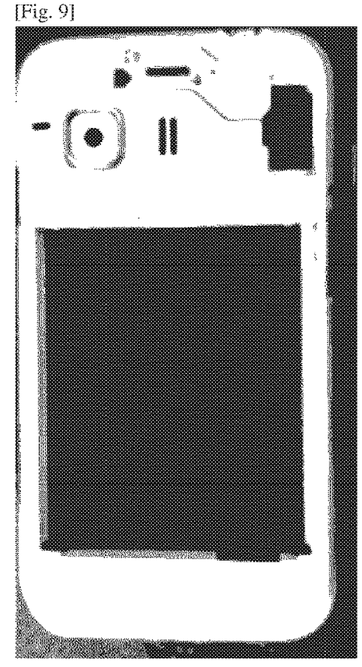
FIG. 9 illustrates a drop hammer test result of a rear cover of the smart device manufactured using the specimens according to Examples 1 to 4.

FIG. 8 illustrates a drop hammer test result of a battery cover manufactured using the specimens according to Examples 1 to 4. FIG. 9 illustrates a drop hammer test result of a rear cover of the smart device manufactured using the specimens according to Examples 1 to 4.

As illustrated in FIGS. 8 and 9, notches were not observed in the battery cover and the rear cover of the smart device manufactured using the polymer compositions according to Examples 1 to 4 by the drop hammer test. Thus, it was confirmed that reliable results were obtained in the drop hammer test.

In order to obtain reliable deposition coating, the specimens according to Examples 1 to 4 and Comparative Example 4 were tested with and without the deodorant. As a result of deposition coating test, all of the specimens passed the reliability standards regardless of the deodorant. However, the deodorant may be used, if required, to obtain diversity of designs of the molded article.

Also, in order to obtain reliable surface stability, the specimens according to Examples 1 to 4 and Comparative Example 4 were tested with and without a surface stabilizer. As a result, all of the specimens passed reliability standards regardless of the surface stabilizer. However, the surface stabilizer may be used, if required, to obtain diversity of designs of the molded article.

Based on the test results, it was confirmed that chemical resistance of the specimens, which deteriorates by the structure of the low molecular weight polycarbonate, was improved by reducing the amount of the low molecular weight polycarbonate.

Also, it was confirmed that physical properties of the specimens, which deteriorate by notches, were improved by adding the core-shell type elastomer thereto. However, Izod notched impact strength and Izod un-notched impact strength may deteriorate when an excess of the core-shell type elastomer was used. If the amount of the core-shell type elastomer is not sufficient, external impact cannot be sufficiently dispersed, failing in preventing deterioration of physical properties. It was confirmed that there is a need to appropriately control the amount of the core-shell type elastomer.

The polymer compositions having flame retardancy and eco-friendliness, molded articles including the same, and methods of manufacturing the molded articles have been described above. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A polymer composition comprising:
   a thermoplastic resin comprising polycarbonate having a melt index of 45 g/10 min or less (300° C., 1.2 kg) and polycarbonate having a melt index greater than 45 g/10 min (300° C., 1.2 kg);
   a post-consumer material (PCM) resin;
   a bio-based resin; and
   a core-shell type elastomer.

2. The polymer composition according to claim 1, wherein the bio-based resin comprises at least one selected from the group consisting of poly(cyclohexylene dimethylene terephthalate) glycol (PCTG) and poly(ethylene terephthalate) glycol (PETG).

3. The polymer composition according to claim 1, wherein the PCM resin comprises a PCM polycarbonate.

4. The polymer composition according to claim 1, wherein the core-shell type elastomer comprises:
   a core comprising at least one selected from the group consisting of butadiene and a butylacrylate-styrene copolymer; and
   a shell comprising polymethylmethacrylate (PMMA).

5. The polymer composition according to claim 1, wherein the polymer composition comprises 45 to 60% by weight of the thermoplastic resin, 1 to 20% by weight of the PCM resin, 1 to 20% by weight of the bio-based resin, and 5 to 15% by weight of the core-shell type elastomer.

6. The polymer composition according to claim 5, wherein the 45 to 60% by weight of the thermoplastic resin comprises 45 to 55% by weight of the polycarbonate having a melt index of 45 g/10 min or less (300° C., 1.2 kg) and 0 to 5% by weight of the polycarbonate having a melt index greater than 45 g/10 min (300° C., 1.2 kg).

7. The polymer composition according to claim 1, wherein the polymer composition has an elongation of 110% or greater.

8. The polymer composition according to claim 1, wherein the polymer composition has a flame retardancy level of V2 under the Underwriters Laboratory (UL) 94 standard.

9. The polymer composition according to claim 1, wherein the polymer composition has a melt index of 15 g/10 min or greater (300° C., 1.2 kg).

10. The polymer composition according to claim 1, wherein the polymer composition has an Izod notched impact strength of 60 kgfcm/cm or greater.

11. The polymer composition according to claim 1, wherein the polymer composition has a heat distortion temperature (HDT) of 100° C. or greater.

12. The polymer composition according to claim 1, wherein the polymer composition further comprises an additive.

13. The polymer composition according to claim 12, wherein the additive comprises at least one selected from the group consisting of a wax, a wax type master batch, a heat stabilizer, a UV stabilizer, an antioxidant stabilizer, a deodorant, and a surface stabilizer.

14. A method of manufacturing a molded article, the method comprising:
   preparing a polymer composition comprising a thermoplastic resin comprising polycarbonate having a melt index of 45 g/10 min or less (300° C., 1.2 kg) and polycarbonate having a melt index greater than 45 g/10 min (300° C., 1.2 kg), a post-consumer material (PCM) resin, a bio-based resin, and a core-shell type elastomer by an extruder; and
   injection-molding the polymer composition by feeding the polymer composition into an injection-molding apparatus.

15. The method according to claim 14, wherein the preparing of the polymer composition comprises extruding a composition comprising the thermoplastic resin comprising polycarbonate, the PCM resin, the bio-based resin, and the core-shell type elastomer.

16. The method according to claim 15, wherein the extruding of the composition comprises:
  melting the composition; and
  dispersing the composition by applying a shear stress to the composition.

17. The method according to claim 14, wherein the extruder comprises at least one selected from the group consisting of a continuous flow single screw extruder and a continuous flow twin screw extruder.

18. A molded article comprising a polymer composition comprising a thermoplastic resin comprising polycarbonate having a melt index of 45 g/10 min or less (300° C., 1.2 kg), polycarbonate having a melt index greater than 45 g/10 min (300° C., 1.2 kg), a post-consumer material (PCM) resin, a bio-based resin, and a core-shell type elastomer.

19. The molded article according to claim 18, wherein the article is molded in the shape of film, sheet, pellet, or fiber.

20. The molded article according to claim 18, wherein the molded article comprises an interior material or exterior material of an electronic device.

21. A molded article comprising a polymer composition comprising a thermoplastic resin comprising polycarbonate, a post-consumer material (PCM) resin, a bio-based resin, and a core-shell type elastomer, wherein
  the molded article comprises an interior material or exterior material of an electronic device,
  the electronic device comprises a smart device,
  the interior material comprises a rear cover of the smart device, and
  the exterior material comprises at least one selected from the group consisting of a front cover, a front decoration, a home key, a side key, and a battery cover of the smart device.

22. The molded article according to claim 18, wherein the electronic device comprises at least one selected from the group consisting of a display apparatus, a computer, a tablet PC, a printer, a multifunctional apparatus, a refrigerator, a washing machine, an air conditioner, a camera, an E-BOOK, E-Paper, 3D glasses, and a battery charger.

* * * * *